US012033090B2

(12) United States Patent
Sakai et al.

(10) Patent No.: US 12,033,090 B2
(45) Date of Patent: Jul. 9, 2024

(54) INFORMATION PROCESSING DEVICE, PUBO SOLVER, INFORMATION PROCESSING METHOD AND NON-TRANSITORY STORAGE MEDIUM

(71) Applicants: KABUSHIKI KAISHA TOSHIBA, Tokyo (JP); TOSHIBA DIGITAL SOLUTIONS CORPORATION, Kawasaki (JP)

(72) Inventors: Yoshisato Sakai, Kawasaki Kanagawa (JP); Kotaro Endo, Tokyo (JP)

(73) Assignees: Kabushiki Kaisha Toshiba, Tokyo (JP); Toshiba Digital Solutions Corporation, Kawasaki (JP)

( * ) Notice: Subject to any disclaimer, the term of this patent is extended or adjusted under 35 U.S.C. 154(b) by 0 days.

(21) Appl. No.: 17/249,312

(22) Filed: Feb. 26, 2021

(65) Prior Publication Data

US 2021/0182720 A1 Jun. 17, 2021

Related U.S. Application Data

(63) Continuation of application No. PCT/JP2020/006291, filed on Feb. 18, 2020.

(30) Foreign Application Priority Data

Jun. 6, 2019 (JP) ................................ 2019-106437

(51) Int. Cl.
*G06N 7/08* (2006.01)
*G06F 7/50* (2006.01)
(Continued)

(52) U.S. Cl.
CPC ................. *G06N 7/08* (2013.01); *G06F 7/50* (2013.01); *G06F 7/535* (2013.01); *G06F 17/11* (2013.01); *G06N 10/80* (2022.01)

(58) Field of Classification Search
CPC .......... G06N 10/00; G06N 10/80; G06N 7/08; G06F 17/11; G06F 7/50; G06F 7/52; G06F 7/523; G06F 7/535
See application file for complete search history.

(56) References Cited

U.S. PATENT DOCUMENTS 10,592,816 B1 * 3/2020 Hsu ........................ G06N 10/00
2015/0262074 A1 9/2015 Bruestle et al.
(Continued)

FOREIGN PATENT DOCUMENTS

JP 2017-515195 A 6/2017
JP 2017-224227 A 12/2017

OTHER PUBLICATIONS https://qubovert.readthedocs.io/en/latest/BO/sat.html, 2004 (Year: 2004).*
(Continued)

*Primary Examiner* — Emily E Larocque
(74) *Attorney, Agent, or Firm* — Finnegan, Henderson, Farabow, Garrett & Dunner, LLP

(57) ABSTRACT

According to one embodiment, an information processing device includes a first storage and a first processing circuit. The first storage is configured to store constraint data which includes a constraint of a combinatorial optimization problem expressed in a formal language. The first processing circuit is configured to generate logical expression data from the constraint data and generate a penalty term data including a penalty term having a binary variable parameter by converting the logical expression data.

19 Claims, 11 Drawing Sheets

(51) Int. Cl.
*G06F 7/535* (2006.01)
*G06F 17/11* (2006.01)
*G06N 10/80* (2022.01)

(56) References Cited

U.S. PATENT DOCUMENTS

| | | | |
|---|---|---|---|
| 2016/0171368 A1* | 6/2016 | Aspuru-Guzik | G06N 5/02 706/46 |
| 2017/0364477 A1 | 12/2017 | Thach et al. | |
| 2019/0019103 A1 | 1/2019 | Dadashikelayeh | |
| 2019/0087388 A1 | 3/2019 | Venturelli et al. | |
| 2020/0302306 A1* | 9/2020 | Matsuo | G06N 5/01 |
| 2023/0162158 A1* | 5/2023 | Terasaki | G06F 17/11 705/7.18 |

OTHER PUBLICATIONS

Andrzejewski et al., A Framework for Incorporating General Domain Knowledge into Latent Dirichlet Allocation using First Order Logic, Proceedings of the Twenty-Second International Joint Conference on Artificial Intelligence, 2011 (Year: 2011).*

E.G. Rieffel et al., A case study in programming a quantum annealer for hard operational planning problems, arXiv:1407.2887v1 [quant-ph], 2014 (Year: 2014).*

D.A. Patterson et al., Computer Organization and Design: The Hardware/Software Interface, Elsevier Science & Technology, 2007 (Year: 2007).*

R. Babbush, et al.,"Resource Efficient Gadgets for Compiling Adiabatic Quantum Optimization Problems," Annalen der Physik, vol. 25, arXiv:1307.8041v1, 11 pages (2013).

V. Denchev, et al., "What is the Computational Value of Finite Range Tunneling?," Phys. Rev., arXiv:1512.02206v4, 17 pages (2016).

A. Lucas, "Ising formulations of many NP problems," Frontiers in Physics, arXiv:1302.5843v3, 27 pages (2014).

S. Pakin, "Targeting Classical Code to a Quantum Annealer," Architectural Support for Programming Languages and Operating Systems (ASPLOS '19), pp. 529-543 (2019).

* cited by examiner

```
module top ( a, b, c, d);
   input a,b,c;
   output d;
   assign d = ((!a) | (!b)) & c;
endmodule
```

| $x_a$ | $x_b$ | $x_c$ | $x_e$ | $r(...)$ |
|---|---|---|---|---|
| 0 | 0 | 0 | 0 | 6 |
| 0 | 0 | 0 | 1 | 1 |
| 0 | 0 | 1 | 0 | 0 |
| 0 | 1 | 0 | 0 | 4 |
| 0 | 1 | 0 | 1 | 1 |
| 0 | 1 | 1 | 0 | 2 |
| 0 | 1 | 1 | 1 | 0 |
| 1 | 0 | 0 | 0 | 4 |
| 1 | 0 | 0 | 1 | 1 |
| 1 | 0 | 1 | 1 | 0 |
| 1 | 1 | 0 | 0 | 3 |
| 1 | 1 | 0 | 1 | 2 |
| 1 | 1 | 1 | 0 | 1 |
| 1 | 1 | 1 | 1 | 1 |

FIG. 5

| PATTERN BEFORE CONVERSION | PATTERN AFTER CONVERSION |
|---|---|
| ∧ | × |
| ∨ | + |
| A | $x$ |
| $\overline{A}$ | $1-x$ |

| $x_a$ | $x_b$ | $x_c$ | $p(\cdots)$ |
|---|---|---|---|
| 0 | 0 | 0 | 1 |
| 0 | 0 | 1 | 0 |
| 0 | 1 | 0 | 1 |
| 0 | 1 | 1 | 0 |
| 1 | 0 | 0 | 1 |
| 1 | 0 | 1 | 0 |
| 1 | 1 | 0 | 2 |
| 1 | 1 | 1 | 1 |

FIG.10

```
module top #(parameter n=5) ( in, out );
input[n:1] in;
output   out;
assign out = 7*in[1]+2*in[2]+5*in[3]+4*in[4]+3*in[5] <= 15;
endmodule
```

FIG.12

INFORMATION PROCESSING DEVICE, PUBO SOLVER, INFORMATION PROCESSING METHOD AND NON-TRANSITORY STORAGE MEDIUM

CROSS REFERENCE TO RELATED APPLICATIONS

This application is continuation application of International Application No. JP2020/006291, filed on Feb. 18, 2020, which claims priority to Japanese Patent Application No, 2019-106437, filed on Jun. 6, 2019, the entire contents of which are incorporated herein by reference.

FIELD

Embodiments described herein relate generally to an information processing device, a PUBO solver, an information processing method and a non-transitory storage medium.

BACKGROUND

Computers which calculate the energy of the Ising Model in its ground state are used to solve combinatorial optimization problems within shorter periods of time. If these computers are used, the combinatorial optimization problems are converted to Ising Models, beforehand. However, since the Ising Model itself does not include explicit constraints, the constraints need to be embedded into the objective functions as penalty terms.

The task of designing penalty terms are difficult and require specialized knowledge. Also, the penalty term itself may become an obstacle in solving the combinatorial optimization problems. For example, if the number of decision variables increases due to the penalty term, the computation resource required for solving the combinatorial optimization problems becomes too large. Also, since the range of the penalty term is greater than the original objective function, calculation of the solution may become difficult. Technology which enables generation of practical penalty terms and accelerates the calculation of combinatorial optimization problems is required.

BRIEF DESCRIPTION OF DRAWINGS

FIG. 5 is a table presenting examples of values of a penalty term generated by a method of a related art, for each combination of decision variables;

FIG. 9 is a diagram presenting a first example of a conversion rule;

FIG. 10 is a table presenting examples of values of a penalty term, for each combination of decision variables;

FIG. 12 is a diagram presenting a second example of the Verilog-HDL file; and

DETAILED DESCRIPTION

Figure 1:
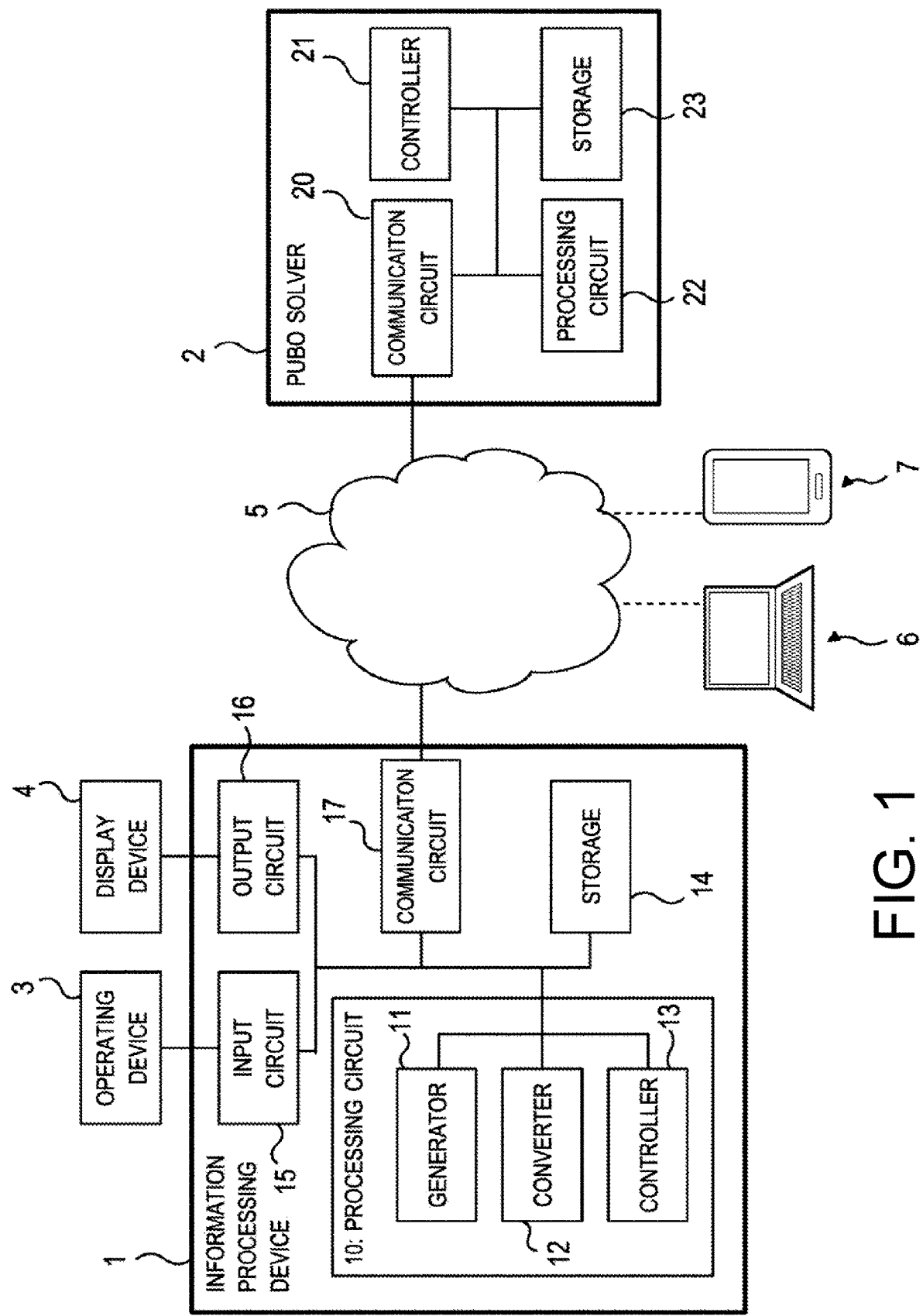
FIG. 1 is a block diagram presenting a configuration example of an information processing device.

According to one embodiment, an information processing device includes a first storage and a first processing circuit. The first storage is configured to store constraint data which includes a constraint of a combinatorial optimization problem expressed in a formal language. The first processing circuit is configured to generate logical expression data from the constraint data and generate a penalty term data including a penalty term having a binary variable parameter by converting the logical expression data.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

Hereinafter, embodiments of the present invention will be described with reference to the drawings, FIG. 1 is a block diagram presenting a configuration example of an information processing device. The information processing system of FIG. 1 includes a processing device 1, a PUBO solver 2, an operating device 3, a display device 4, a client device 6, and a client device 7. The information processing device 1, the PUBO solver 2, the client device 6 and the client device 7 can communicate with each other via the network 5. For example, the network 5 is the internet where a plurality of computer networks are connected to each other. The network 5 can use wired communication, wireless or a combination of these as the communication medium. Also, examples of the communication protocols used in the network 5 include TCP/IP. However, the type of communication protocol is not limited. The operating device 3 and the display device 4 are connected to the information processing device 1.

The information processing device 1 is a computer including a central processing device (CPU) and a memory. Examples of the information processing device 1 include servers, desktop computers and laptop computers. However, the information processing device 1 can be any type of computer. The information processing device 1 executes various arithmetic operations to control the PUBO solver 2. The operating device 3 is a device which can be used for entering information to the information processing device 1. The operating device 3 can be a keyboard, a mouse, a touch panel, or a sound recognition device. However, any other type of device can be used as the operating device 3. The display device 4 is a device which displays images, videos or texts output from the information processing device 1. Examples of the display device 4 include, liquid crystal displays (LCDs), organic electroluminescence displays (OLEDs), micro-LED displays and projectors. However, any other type of display can be used. The users can execute various operations of the information processing device 1 by using the operating device 3 and the display device 4. At least either the operating device 3 or the display device 4 can be embedded in the information processing device 1.

The PUBO solver 2 is either a computer which calculates values of spins in the Ising Model (Ising Machine) or a computer which can solve Polynomial Unconstrained Binary Optimization (PUBO). Examples of the PUBO solver 2 include computers which use super conducting quantum bits (Quantum Annealing Machines) and computers which use optical parametric oscillators. Physical phenomena can be emulated by executing programs on von Neumann machines. Also, various meta-heuristic algorithms can be executed on von Neumann machines. Moreover, the values of the spins (binary variables) can be calculated by combining von Neumann machines with hardware circuits such as the FPGA, ASIC and GPU. Any type of algorithm can be used for the calculating values of spins. The types and configurations of the PUBO solver are not limited.

In FIG. 1, one PUBO solver is presented. However, the number of PUBO solvers can be different. For example, a plurality of PUBO solvers can execute calculations in parallel. Also, the information processing system can include different types of PUBO solvers. At least part of the features of the information processing device 1 and the PUBO solver 2 can be implemented in Virtual Machines (VMs) or containers. Also, the features of the information processing device 1 and the PUBO solver 2 can be implemented by using a plurality of computers. In FIG. 1, the information processing device 1 and the PUBO solver 2 are different computers. However, this configuration is only an example. For example, at least part of the features of the information processing device 1 and at least part of the features of the PUBO solver 2 can be implemented on a same computer.

For example, the client device 6 is a laptop PC. For example, the client device 7 is a smartphone. Both client devices 6 and 7 can communicate with other devices connected to the network 5 by wireless communication (for example, by using wireless LAN or mobile communication protocols). Laptop PCs and smartphones are only examples of client devices which can be used in the information processing system. Therefore, other types of client devices such as desktop PCs, tablets, in-vehicle devices and microprocessors implemented in embedded devices. The users can use the client device to operate the information processing device 1 from a remote environment. In this case, the client device has the features of the aforementioned operating device 3 and the display device 4.

Next, each of the components in the information processing device 1 is described. The information processing device 1 includes a processing circuit 10, a storage 14, an input circuit 15, an output circuit 16 and a communication circuit 17.

The processing circuit 10 is an electronic circuit which executes arithmetic operations and controls the whole information processing device 1. For example, a CPU, a microprocessor, ASIC, FPGA, PLD or a combination of these can be used as the processing circuit 10. At least part of the features of the information processing device 1 can be implemented in the processing circuit 10 (a hardware circuit). Also, part of the features of the information processing device 1 can be implemented in a program which is executable on the processing circuit 10. In this case, the program is stored in a non-transitory computer readable storage medium. Example of a non-transitory computer readable storage medium is the storage 14 which is described later.

The processing circuit 10 includes a generator 11, a converter 12 and a controller 13 as internal components. The generator 11 generates a logical expression based on the constraint of a combinatorial optimization problem expressed in formal language. The converter 12 generates a penalty term by converting the logical expression. The generated penalty term has binary variables as parameters. The penalty term or the objective function of the combinatorial optimization problem including the penalty term can be expressed according to the form of Polynomial Unconstrained Binary Optimization (PUBO). In other words, the penalty term or the objective function of the combinatorial optimization problem including the penalty term can be a polynomial of degree 2 or lower. However, the penalty term or the objective function of the combinatorial optimization problem including the penalty term can have a degree of 3 or greater. For example, the converter 12 can convert the logical conjunction in the logical expression and the logical disjunction in the logical expression to an arithmetic operation. Also, the converter 12 can convert the positive literal of the logical variable and the negative literal of the logical variable to an expression including binary variables. Thereby, the converter 12 can generate the penalty term. The solution of the combinatorial optimization problem can be calculated based on the solution of the Ising Model having binary variables as spins. In order to calculate the solution of the Ising Model, the controller 13 controls the PUBO solver 2. For example, the controller 13 transmits instructions for starting the calculation of spins in the Ising Model, to the PUBO solver 2. Also, the controller 13 obtains the calculation result from the PUBO solver 2. Then, the converter 12 obtains the solution of the combinatorial optimization problem based on the solution of the Ising Model. The solution of the combinatorial optimization problem can be presented to the user via the aforementioned display device 4. Details of the generator 11 and the converter 12 are mentioned later.

The storage 14 provides storage space for saving data such as the programs of the information processing device 1 and data required for execution of the programs. Here, programs include both the operating system (OS) and the applications. The storage can include volatile memory, non-volatile memory or a combination of these. Examples of volatile memory include DRAM and SRAM. Examples of non-volatile memory include NAND flash memory, NOR flash memory, resistive random access memory and magnetoresistive random access memory. Also, hard disk drives, optical disks, magnetic tapes or external storage devices can be used as the storage 14.

The input circuit 15 is a circuit which enables input of data to the information processing device 1. For example, the aforementioned operating device 3 can be connected to the information processing device 1 via the input circuit 15. Examples of the input circuit 15 include interface circuits for USB, PCI-Express and serial communication. However, any type of interface circuit can be used. The output circuit 16 is a circuit which enables data output from the information processing device 1. For example, the aforementioned display device 4 is connected to the information processing device 1 via the output circuit 16. Examples of the output circuit 16 include interface circuits for HDMI and DisplayPort. However, any other type of interface can be used.

The communication circuit 17 of the information processing device 1 enables communication of data with each of the devices connected to the network 5. For example, the communication circuit 17 is a Network Interface Card (NIC) of wired LAN. However, the communication circuit 17 can be other types of communication circuits such as wireless LAN.

As mentioned above, the PUBO solver 2 calculates the values of the spins in the Ising Model in its ground state. The PUBO solver 2 includes a communication circuit 20, a controller 21, a processing circuit 22 and a storage 23. In the following, an overview of the Ising Model is described before proceeding into the details of each component in the PUBO solver 2. The following equation (1) is a Hamiltonian H of the Ising Model. The Hamiltonian H corresponds to the energy of the Ising Model. The Hamiltonian H corresponds is an example of the objective function used in solving combinatorial optimization problems.

$$H = -\sum_{<i,j>} J_{ij} s_i s_j - \sum_{i=1}^{N} h_i s_i \quad (1)$$

Here, $J_{ij}$ is a matrix including coupling coefficients between spins. Also, $s_i$ and $s_j$ above are binary variables (spins) which take either +1 or −1 as the value. Also, $h_i$ is a vector of local magnetic fields at each spin. Equation (1) above is a quadratic polynomial having spins $s_i$ and $s_j$ as the variables. However, some PUBO solvers can calculate objective functions with terms of degrees 3 or higher. Therefore, the Ising Model does not necessary have to be a quadratic polynomial. For example, an Ising Model including terms of degrees 3 or higher can be used. Such Ising Models are Ising Models which include many-body interaction in terms of physics. In the following, if an Ising Model is referred, it includes Ising Models described with expressions with terms of degrees 3 or higher (Ising Models with many-body interaction), as well as Ising Models described by quadratic polynomials. Thus, at least either the penalty term generated by the information processing device 1 or the objective function of the combinatorial optimization problem including the penalty term can include a terms of degrees 3 or higher. In this case, the PUBO solver 2 calculates the solution of the Ising Model with terms of degrees 3 or higher.

The processing circuit 22 of the PUBO solver 2 calculates values of the spins in the Ising Model. For example, the processing circuit 22 can try to calculate the combination of parameters $(s_1, s_2, \ldots, s_N)$ which can minimize the value of the Hamiltonian H. The solution of the Ising Model calculated by the processing circuit 22 can be expressed as the combination of parameters $(s_1, s_2, \ldots, s_N)$ mentioned above. It can be expected that the solution calculated by the processing circuit 22 is an optimal solution which can minimize the value of the Hamiltonian H. However, the solution calculated by the processing circuit 22 does not necessary have to be precisely an optimal solution. For example, the processing circuit 22 can calculate the optimal solution by executing the calculation process in a plurality of trials. Also, a plurality of processing circuits 22 can execute the calculation process concurrently to obtain the optimal solution.

The communication circuit 20 of the PUBO solver 2 enables communication of data with each of the devices connected to the network 5. For example, the communication circuit 20 is a Network Interface Card (NIC) for wired LAN. However, the communication circuit 20 can be a different type of communication card such as wireless LAN.

The controller 21 of the PUBO solver 2 controls each of the components in the PUBO solver 2. The communication circuit 20 of the PUBO solver 2 can receive the control signal transmitted from the information processing device 1 via the network 5. The controller 21 of the PUBO solver 2 controls the processing circuit 22 based on the received control signal. Also, the controller 21 of the PUBO solver 2 transmits the data including the solution of the Ising Model calculated by the processing circuit 22, to the information processing device 1 via the communication circuit 20.

The storage 23 provides storage space which can be used to save various data required for execution of processes in the PUBO solver 2. For example, the controller 21 of the PUBO solver 2 can use the storage 23 as a buffer where the data of the Ising Model and the solution of the Ising Model are saved temporarily. Also, programs and data used for control can be saved in the storage 23.

The storage 23 can include volatile memory, non-volatile memory or a combination of these. Examples of volatile memory include DRAM and SRAM. Examples of non-volatile memory include NAND flash memory, NOR flash memory, resistive random access memory and magnetoresistive random access memory. Also, hard disk drives, optical disks, magnetic tapes or external storage devices can be used as the storage 23. The type of storage/memory used as the storage 23 is not limited. Also, the storage 23 can be a combination of different types of memory and storage. However, the PUBO solver 2 does not necessary have to include a storage 23.

Figure 2:
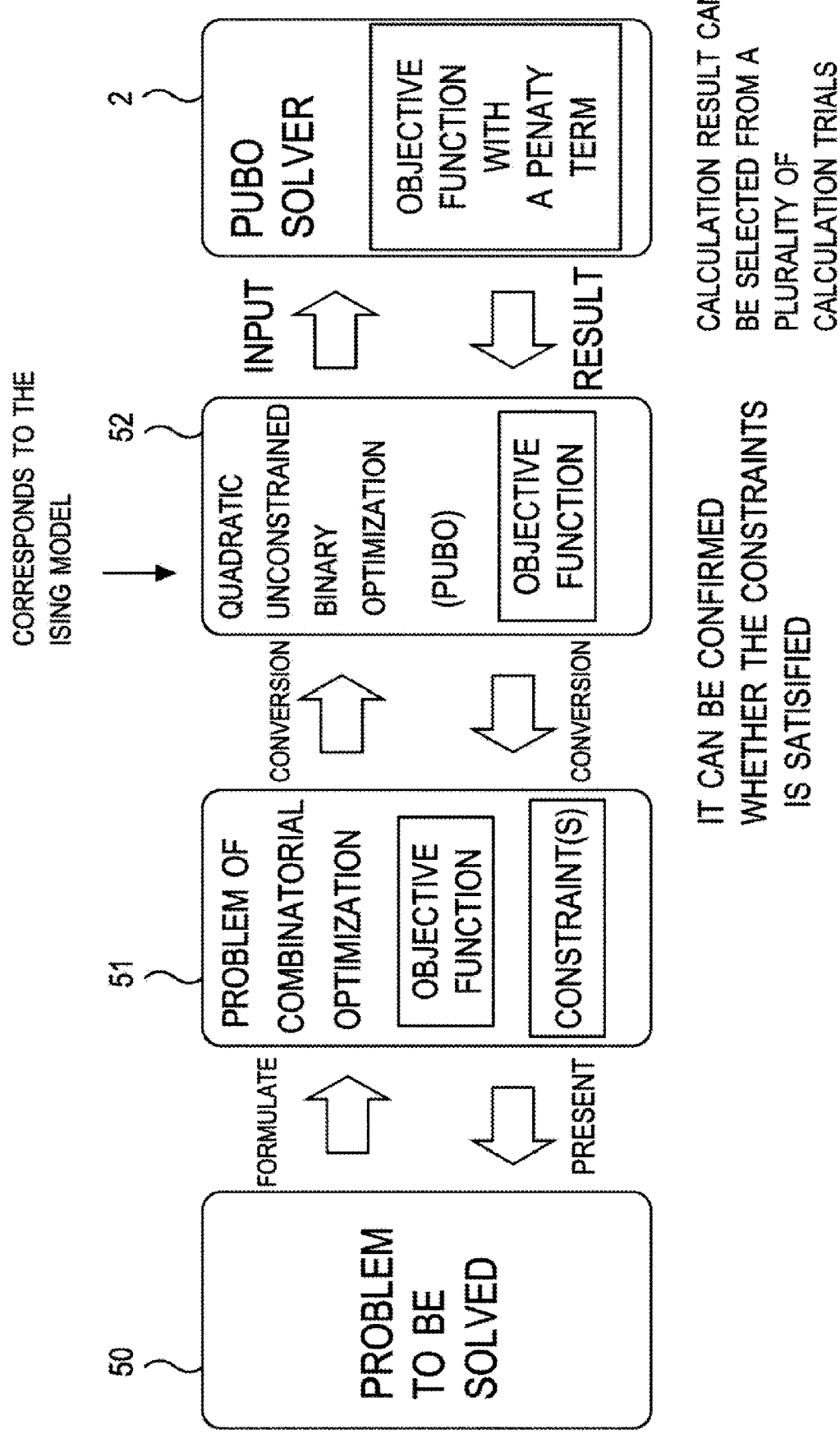
FIG. 2 is a diagram presenting an example of processes necessary to solve a problem using a PUBO solver.

FIG. 2 is a diagram presenting an example of processes necessary to solve a problem using a PUBO solver. In the following, the related art is explained with reference to FIG. 2.

An appropriate combination needs to be found under a certain restriction, in order to achieve the desired goal, for problems which need to be solved in the society (problem 50 in FIG. 2). Examples of such problems include assignments of delivery vehicles in the field of logistics and assignments of tasks to processors. Combinatorial optimization can be used to solve these problems. Generally, in the field of optimization including combinatorial optimization, problems can be expressed using the objective function and constraints. The value of the objective function indicates the quality of the solution. The constraint defines the condition the solution should satisfy.

In order to solve the combinatorial optimization problem, the PUBO solver 2 described above can be used. However, the number of computers (solvers), types of computers and configuration of computers used for solving the combinatorial optimization problem is not limited.

The user needs to convert the objective function and the constraint to an adequate data format so that they can be processed by the computer. For example, when the PUBO solver 2 is used, the objective function and the constraint needs to be converted to a format which is compatible with the Ising Model. In the following, a case when the PUBO solver is used to solve the combinatorial optimization problem is explained as an example. However, computers other than the PUBO solver can be used to calculate the solutions.

One example of the combinatorial optimization is the knapsack problem. Here, the knapsack problem is explained. Suppose, there are N items $b_1$ to $b_N$ each with weight $w_i$ and value $v_i$ (i=1, 2, ..., N). In the knapsack problem, the items packed into the knapsack are selected until the total weight of the selected items reach the weight W. During the selection of items packed into the knapsack, the constraint including the following two conditions: (1) keeping the total weight of the selected items within the upper limit W and (2) maximizing the total value of the selected items, needs to be fulfilled.

To describe the combination of selected items, variables $x_1$ to $x_n$ each corresponding to the items $b_1$ to $b_N$ can be introduced. The variables $x_1$ to $x_n$ are binary variables which take either 0 or 1 as the values. For example, if item $b_1$ is selected as the item to be packed into the knapsack, $x_1=1$ holds. On the other hand, if item $b_1$ is not selected as the item to be packed into the knapsack, $x_1=0$ holds.

If the aforementioned notation is used, the objective function of the knapsack problem can be described according to the mathematical expression (2) below.

$$\sum_{i=1}^{N} v_i x_i \quad (2)$$

Also, the constraint of the knapsack problem can be described according to condition (3) below.

$$\sum_{i=1}^{N} w_i x_i \leq W \quad (3)$$

The variables $x_1$ to $x_n$ which maximizes the expression (2) while satisfying the condition of (3) can be the solution of the knapsack problem. In the following explanation, "x" with the alphanumerical index is used to describe each of the binary variables.

In optimization including combinatorial optimization, the problem can be defined by using the objective functions and the constraints, as mentioned above. Problem 51 in FIG. 2 describes a combinatorial optimization problem including the objective function and the constraint. The values of parameters in the problem are referred to as the instance of the problem. In the example mentioned above, the values of $v_i$ to $v_N$, $w_N$ to IAN and W correspond to the instance of the problem. Also, the variables which indicate the combination of values are called the decision variables. In the example mentioned above, $x_1$ to $x_N$ correspond to the decision variables.

The total number of combinations of values in the decision variables in the example mentioned above is $2^N$. The combinations of values in the decision variables which satisfy the constraint are called the feasible solutions. The feasible solution which maximizes the objective function corresponds to the solution of the instance. If the sign of the objective function is negative, the feasible solution which minimizes the objective function corresponds to the solution of the instance. Conventionally, the combination of variables of the decision variables obtained as a result of optimization is called the solution, even for cases when the feasible solution which strictly maximizes or minimizes the objective function is not obtained.

Recently, in the field of combinatorial optimization, the Hamiltonian (energy function) of the Ising Model is often used as the objective function of the problem. In the following, such optimization problems are called the Ising Problem. As described in equation (1) above, the values of the decision variables (spins) in the Ising Problem are either −1 or +1. Therefore, conversion to the Quadratic Unconstrained Binary Optimization can be executed easily. For example, during the conversion process, the pair of values 0 and 1 can be mapped to a pair of values +1 and −1, or another pair of values −1 and +1, respectively.

In the Ising Problem, if an Ising Model which does not include an explicit constraint can be expressed as a quadratic polynomial. This quadratic polynomial is a multilinear function. In many cases, the solution which minimizes the objective function (the solution which corresponds to the ground state energy) is calculated in the Ising Problem. If an Ising Model which can be expressed using a quadratic polynomial, the Ising Problem is equivalent to QUBO (Quadratic Unconstrained Binary Optimization) or mutually convertible with QUBO. Also, if Hamiltonians with terms of degree 3 or higher are handled, the Ising Problem may take the format of PUBO (Polynomial Unconstrained Binary Optimization).

In some cases, the use of objective functions with degrees 2 or lower is required to enter the data of the problem to the PUBO Solver 2 mentioned above. For example, an introduction of an "ancilla gadget" to the Ising Model has been proposed. If the "ancilla gadget" is introduced, the corresponding penalty term is added to the objective function. The penalty term may include auxiliary variables, increasing the total number of decision variables. Thereby, the higher-order multilinear function can be converted to functions of degree 2 or lower. However, the objective function of the Ising Problem does not necessary have to be degree 2 or lower. For example, in Quantum Annealing, technology for handling objective functions with degrees 3 or higher is being researched. Moreover, if the Ising Problem is solved by Simulated Annealing (SA), the degree of the objective function does not necessary have to be 2 or lower.

To solve the combinatorial optimization problem by using the PUBO Solver 2, the problem needs to be converted to the form of the Ising Model. Actual combinatorial optimization problems often include constraints. However, as mentioned above, the Ising Problem does not include an explicit constraint. Therefore, during the conversion process of the problem, some element corresponding to the constraint needs to be included in the expressions.

For example, a penalty function can be prepared based on the constraint. Then, the penalty function can be added to the original objective function weighted with a coefficient. Thereby, the effect corresponding to the constraint can be included in the objective function of the Ising Problem. The penalty function is a function designed so that it takes a relatively small value in a combination of decision variables which satisfy the constraint and takes a relatively large value in a combination of decision variables which does not satisfy the constraint. The term corresponding to the penalty function in the objective function after conversion to the Ising Problem is called the penalty term. Thus, if a combination of decision variables which minimizes the objective function including the penalty term is calculated, a solution which satisfies the constraint can be obtained. When various combinatorial optimization problems are converted to Ising Problems with second order objective functions, the penalty term described above are often included in the expressions.

Next, an example of a case when a penalty term is introduced to the aforementioned knapsack problem is explained. The expression (4) below is an example of the objective function of the knapsack problem including the penalty term.

$$A\left(1 - \sum_{n=1}^{W} y_n\right)^2 + A\left(\sum_{n=1}^{W} ny_n - \sum_{i=1}^{N} w_i x_i\right)^2 - B\sum_{i=1}^{N} v_i x_i \quad (4)$$

Here, the decision variables ($y_n$ and $x_i$) take either 0 or 1 as the values. Also, the upper limit of the total weight W and the weights $w_i$ of each item are natural numbers. The two terms including the coefficient A in expression (4) corresponds to the penalty term. The term including the coefficient B is the original objective function of the knapsack problem. Here, a combination of decision variables which minimizes the objective function is calculated. Thus, the sign of the original objective function is negative. The variables $y_1$ to $y_n$ are decision variables (auxiliary variables) introduced along with the penalty term. In the expression of (4), W auxiliary variables are introduced. By using a method called the "log trick", the number of auxiliary variables can be reduced. The values of the coefficients A and B can be determined so that the ratio A/B is greater than the maximum values of $v_i$ to $v_N$. However, this is only one example of the methods which can be used to determine the coefficients A and B.

The design of the penalty term requires special knowledge. Even for engineers who have knowledge and experience in the field of combinatorial optimization, the designs and selections of the penalty term is a difficult task.

In the following, the size of the penalty term is evaluated by using parameters from specific instance examples. Here, the number N of candidate items to be packed into the knapsack is 5. Also, the total weight of items which can be packed into the knapsack is W=15 at maximum. The weights of the items $b_1$ to $b_5$ are, $w_1=7$, $w_2=2$, $w_3=5$, $w_4=4$ and $w_5=3$, respectively. Also, the values $v_1$ to $v_5$ for the items $b_1$ to $b_5$ are set to 1, respectively.

The following (5) includes the penalty term part extracted from (4) described above.

$$A\left(1 - \sum_{n=1}^{W} y_n\right)^2 + A\left(\sum_{n=1}^{W} ny_n - \sum_{i=1}^{N} w_i x_i\right)^2 \quad (5)$$

In (5), if the values of $y_1$ to $y_w$ are all 1 and the values of $x_1$ to $x_N$ are all 0, the value of the penalty term excluding the coefficient A is 14596. Also, if the values of $y_1$ to $y_w$ are all 0 and the values of $x_1$ to $x_N$ are all 1, the value of the penalty term excluding the coefficient A is 441. If the Log Trick is used, the maximum value of the penalty term depends on the design of the mathematical expression. However, the value of the penalty term would be at least 441. On the other hand, the aforementioned expression (2) is an objective function excluding the coefficient—B from terms other than the penalty term in (4). In other words, (2) is the original objective function. The original objective function takes the maximum value 21 when the values of $x_1$ to $x_N$ are all 1. As indicated in the difference of values, the range of the penalty term is wider than the range of the original objective function. If the values of the coefficients A and B are set to ensure that A/B>1 holds, the difference in the size of range of the penalty term and the size of range of the original objective function would become greater.

Here, for the sake of explanation, an instance of limited size with N=5 and W=15 was used. However, the scale of the problem which is solved using computers tends to be greater than the example above. The greater the scale of the problem becomes, the greater the value of the penalty term tends to be with respect to the value of the original objective function. In some PUBO solvers, the range of values which can be handled is limited. Therefore, it is not desired to have the absolute value of the penalty term to become too large. Also, if the value of the penalty term becomes too large with respect to the value of the original objective function, the precision of numerical computation may be affected.

Also, the introduction of the penalty term increases the number of decision variables included in the problem as a side effect. If the number of decision variable increases, the number of spins required for executing calculation in the PUBO solver also increases. Each PUBO solver has an upper limit in the number of spins which can be used in the calculation. Therefore, it is better if the number of decision variables in the problem is reduced. Even when the number of decision variables is within the upper limit of number of spins which can be calculated in the PUBO solver, the greater number of decision variables causes prolonged computation times.

To reduce the difficulty in designing the penalty term, a method for utilizing a design tool (software) during the designing process of penalty term has been proposed. If this method is used, first, the user describes the constraint by using hardware description language. Then, the user generates the design data of the digital circuit by using a logical synthesis tool. Then, the digital circuit is converted to a format including either of predetermined gates each having two input terminals and one output terminal. Next, numbers are assigned to each gate, type of each gate, intermediate output of each gate, the first input terminal of each gate and the second input terminal of each gate, respectively. Then, each of the gates can be converted to matrices based on the assigned numbers. Finally, the matrices based on the constraints are added to generate a single matrix from the whole digital circuit. The matrix generated in the last step presents a multilinear function of second order which can be used as the objective function of the Ising Problem.

According to the method described above, suppose there is a case when a penalty function which takes the value 0 when the logical expression of (6) is satisfied and takes a positive value when the logical expression of (6) is not satisfied is used.

$$(a \lor b) \land c \quad (6)$$

Figures 3, 4:
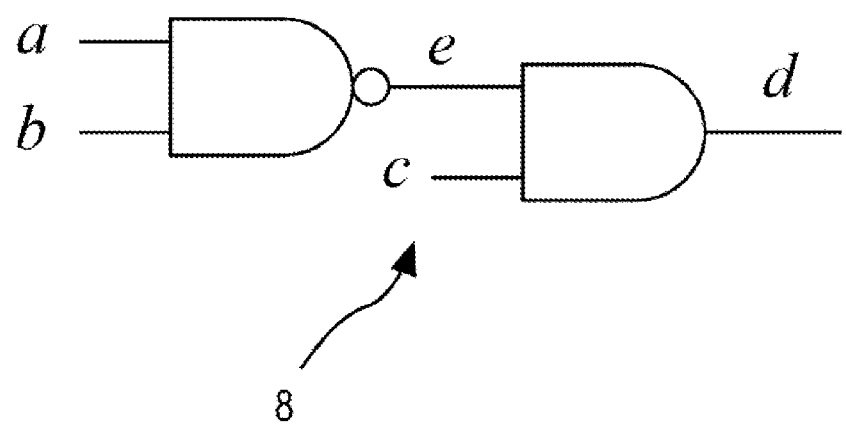
FIG. 3 is a diagram presenting an example of a Verilog-HDL file.
FIG. 4 is a diagram presenting an example of a digital circuit generated by a method of a related art.

FIG. 3 is a diagram presenting an example of a Verilog-HDL file entered by the user to generate the penalty term in expression (6). In the Verilog-HDL file, the operations of the logical variables a, b, c and d are described by using bit operations. In the bit operation of the file, the single bit "1" corresponds to TRUE and the single bit "0" corresponds to FALSE. Verilog-HDL is only an example of the hardware description languages which can be used to describe the penalty term. Therefore, the penalty term can be described using other formal languages.

If the file of FIG. 3 is entered to a logical synthesis tool (for example, Yosys), design data (FIG. 4) of a digital circuit 8 is generated. The "d" in FIG. 3 corresponds to the output terminal of the digital circuit 8. When the logical expression of (6) is TRUE, the value of "d" is a single bit "1". When the logical expression of (6) is FALSE, the value of "d" is a single bit "0". The "e" of the digital circuit 8 is a wiring (logical variable) added by the logical synthesis tool. The "e" of the digital circuit 8 corresponds to the auxiliary variable mentioned above.

As mentioned above, a matrix can be generated based on the data of the digital circuit. However, the "ancilla gadget" of the following equation (7) can be used as well. The "ancilla gadget" of the equation (7) is equivalent to the matrix expression.

$$s(x_1,x_2,x_3)=3x_3+x_1x_2-2x_1x_3-2x_2x_3 \quad (7)$$

The values of the variables $x_1$, $x_2$ and $x_3$ in equation (7) will be either 0 or 1. Also, when the equation $x_1x_2=x_3$ holds, equation (7) would be $s(x_1, x_2, x_3)=0$. If $x_1x_2$ is not equal to $x_3$, $s(x_1, x_2, x_3)>=1$ holds.

The "Ancilla gadget" can be used for AND gates. Therefore, if the "Ancilla gadget" is used for the digital circuit 8 in FIG. 4, (8) below can be obtained.

$$s(x_a,x_b,1-x_e)+S(x_e,x_c,x_d) \quad (8)$$

Here, the values of the variables $x_a$, $x_b$, $x_c$, $x_d$ and $x_e$ would be either 0 or 1. Also, the variables $x_a$, $x_b$, $x_c$, $x_d$ and $x_e$ each correspond to the variables a, b, c, d and a in the Boolean algebra expression. In the expression (8), $1-x_e$ indicates that the negation of the output from the AND gate in the left hand side of the digital circuit 8 is taken. The circle in the AND gate in the left hand side of the digital circuit 8 indicates the "NOT".

The penalty function can be a function which takes a constant value when the constraint is met. Therefore, 1 can be substituted to $x_d$. Then, (7) is substituted to (8). Thereby, the following equation (9) can be obtained.

$$r(\ldots)=x_cx_e+2x_bx_e+2x_ax_e-5x_e-2x_c+x_ax_b-2x_b-2x_a+6 \quad (9)$$

FIG. 5 is a table presenting values of equation (9) for each combination of variables. Referring to the table of FIG. 5, $r(\ldots)=0$ holds when the condition of (10) is satisfied. Also, when the condition of (10) is not satisfied, the equation of (9) takes a positive value. If an adequate value of $x_e$ can be determined, a penalty term which takes 0 as the value when the logical expression of (6) is TRUE and takes a positive value when the logical expression of (6) is FALSE can be obtained.

$$e=(\overline{a}\vee \overline{b}) \text{ and } e\wedge c=\text{TRUE} \quad (10)$$

However, if the method of using the design data of the digital circuit according to the related art is used to generate the penalty function, execution of relatively complicated processes would be required. This is because design data of the digital circuit needs to be generated and the design data needs to be converted to mathematical expressions. Also, as presented in FIG. 4, there are cases when additional auxiliary variables are required. Thus, development of technology generating penalty functions with less computational complexity is expected.

In the following, a method according to an embodiment which avoids increased number of auxiliary variables or minimizes the increased number of auxiliary variables during the generation of the penalty function is explained.

Figure 6:
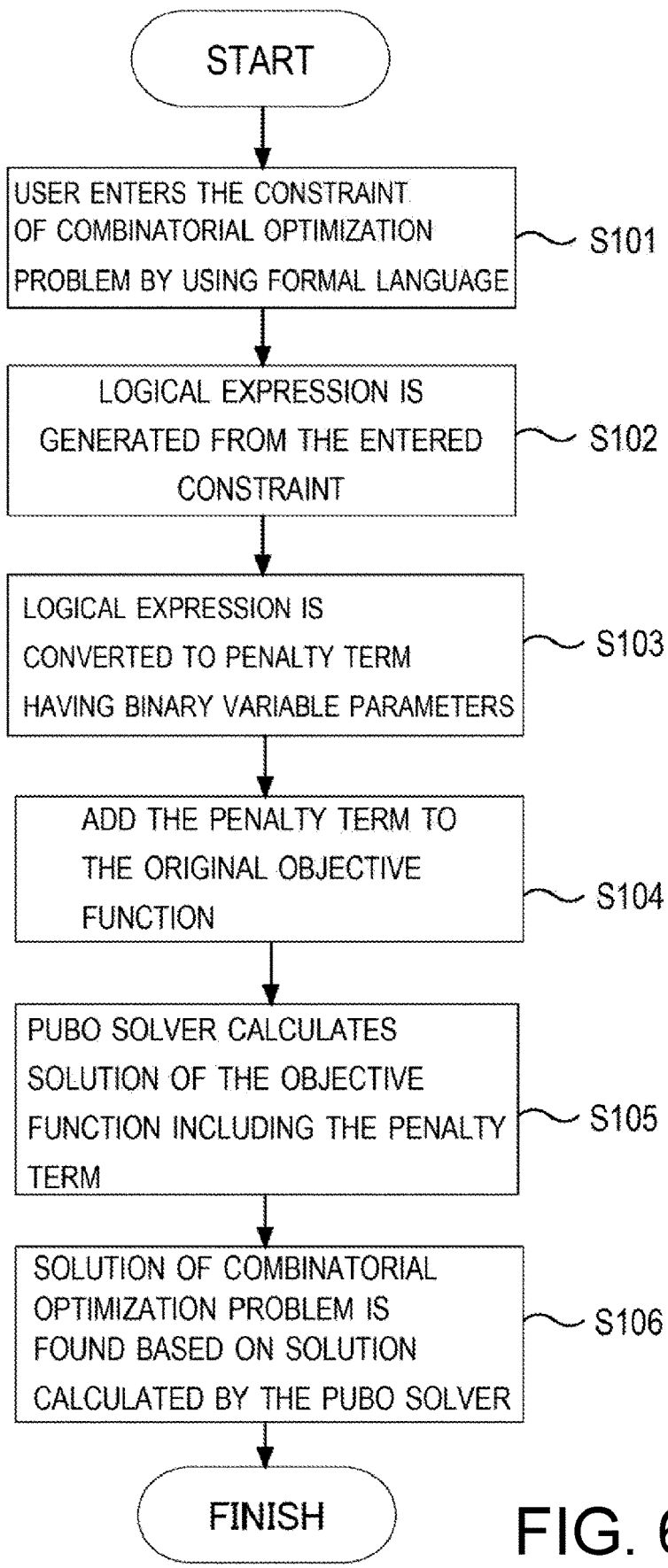
FIG. 6 is a flowchart presenting an example of processes executed by an information processing system.

FIG. 6 is a flowchart presenting an example of processes executed by an information processing system. In the following, the processes executed by the information processing system according to the embodiment are explained with reference to FIG. 6.

First, the user enters the constraint of the combinatorial optimization problem by using formal language (step S101). Various data formats which capable of describing the logical expression can be used as the formal language. For example, C language which is a programming language capable of describing logical expressions can be used as the formal language. Also, EDIF which is a format used for exchanging design data of logical circuits can be used as the formal language. The formal language does not necessary have to be data which can be read and written by human beings. For example, the formal language can be data generated by design tools such as the netlist of LSIs.

In the following, a case when Verilog-HDL which is a type of hardware description language is used as the formal language is explained. However, other types of hardware description languages such as VHDL can be used. As long as description of Boolean algebra is possible, formal languages other than hardware description languages can be used. For example, the user can enter the constraint to the information processing device 1 via the operating device 3. Then, the user can check the entered contents from the display device 4.

Next, the generator 11 generates a logical expression from the entered constraint (step S102). As mentioned below, the logical expression generated by the generator 11 can be simplified. Then, the converter 12 converts the logical expression in the form of Boolean algebra to a penalty term having binary variables as parameters (step S103). In step S103, the logical conjunction of the logical expression and the logical disjunction of the logical expression are converted to arithmetic operations. Also, in step S103, the positive literal of the logical variable and the negative literal of the logical variable are converted to expressions including binary variables. Examples of the conversion rules are mentioned later.

Next, the converter 12 adds the penalty term to the original objective function (step S104). In step S104, the weighted penalty term and the weighted objective function can be added. Then, the controller 13 instructs the PUBO solver 2 to calculate the solution of the objective function including the penalty term (step S105). Thus, the PUBO solver 2 calculates the solution of the Ising Model by using the objective function including the penalty term as the Hamiltonian. Finally, the converter 12 calculates the solution of the combinatorial optimization problem based on the solution of the PUBO solver 2 (Step S106). The solution of the combinatorial optimization problem can be presented to the user from the display device 4 or the client device 6 and 7. The solution of the combinatorial optimization problem can be transmitted to other computers not illustrated in FIG. 1. Also, the solution of the combinatorial optimization problem can be stored in an external storage device.

As mentioned later, the process of step S104 can be skipped. If the process of step S104 is skipped, the controller 13 can instruct the PUBO solver 2 to calculate the solution by using only the penalty term. In the following, details of the processes executed by the generator 11 and the converter 12 are described.

Figure 7:
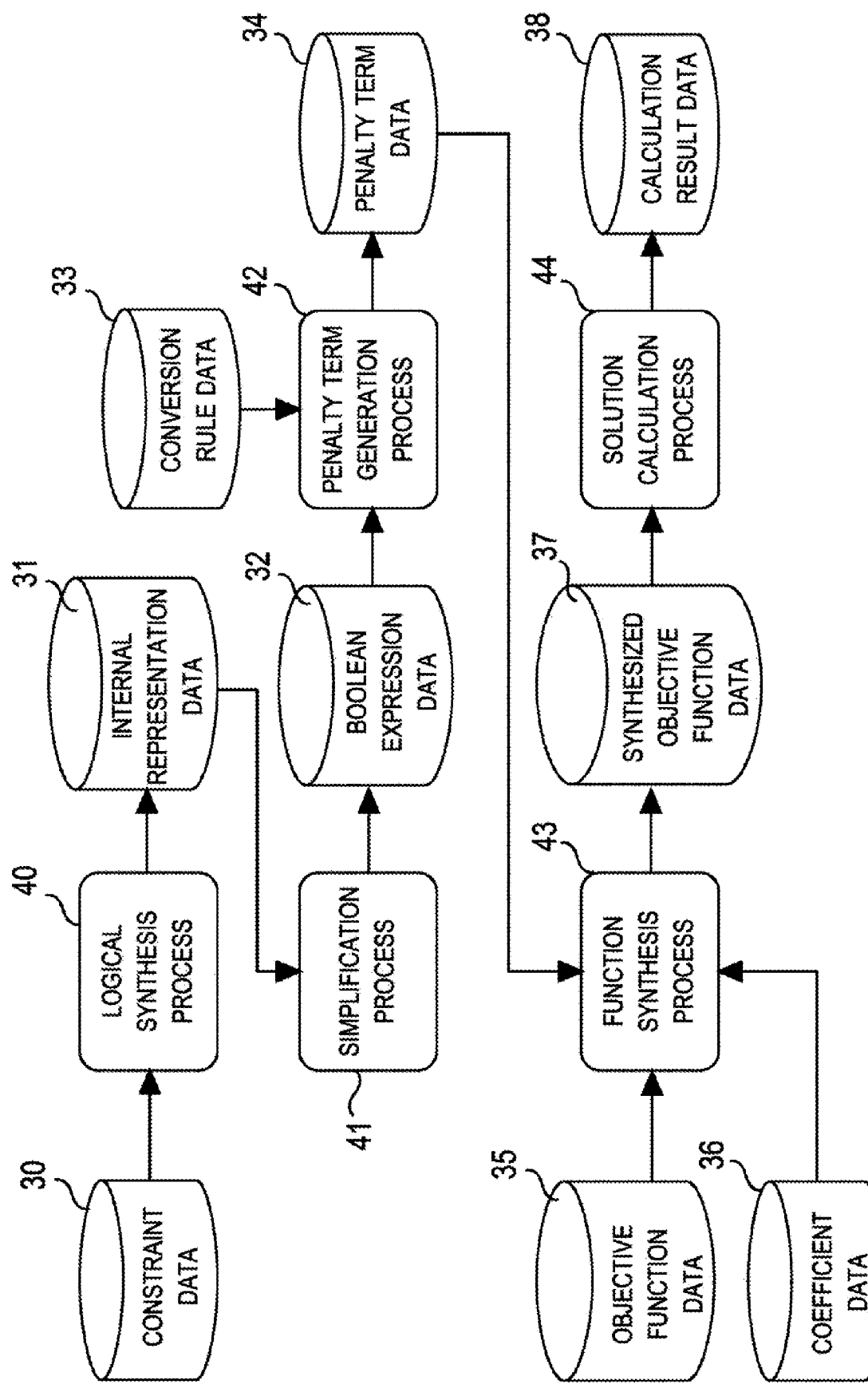
FIG. 7 is a diagram presenting a first example of relation between each processing step executed by the information processing device and data.

FIG. 7 is a diagram presenting a first example of relation between each processing step executed by the information processing device 1 and data. In the following, the processes executed by the information processing device 1 are described with reference to FIG. 7.

In FIG. 7, constraint data 30, internal representation data 31, logical expression data 32, conversion rule data 33, penalty term data 34, objective function data 35, confident data 36, synthesized objective function data 37 and calculation result data 38 are presented as examples. The data presented in FIG. 7 can be saved in the storage 14 of the information processing device 1. However, at least part of the aforementioned data can be stored in other locations such as external storage devices.

Also, in FIG. 7, the logical synthesis process 40, the simplification process 41, the penalty term generation process 42, the function synthesis process 43 and the solution calculation process 44 are presented as examples of processes. For example, the logical synthesis process 40 and the simplification process 41 are executed by the generator 11. Also, the penalty term generation process 42 and the function synthesis process 43 are generated by the converter 12. The solution calculation process 44 is executed by the processing circuit 22 of the PUBO Solver 2.

The constraint data 30 is the data which includes the constraint of the problem. For example, if the problem is a knapsack problem, the constraint is an algebraic expression exemplified in the relation (2) above including the inequality sign. The constraint of the problem can be typed by a user. Also, the constraint of the problem can be downloaded from another information processing device. The logical synthesis process 40 converts the entered constraint data 30 to the internal representation data 31. The logical synthesis process 40 can be executed by a boos (software) which provides the language processor of the hardware description language.

The internal representation data 31 corresponds to the constraint converted to Boolean algebra (logical expressions). The simplification process 41 executes the simplification of logics stored within the internal representation data 31. Examples of the simplification process 41 include simplification to the two-stage logic of AND-OR and simplification by use of Carnot diagrams. Tools such as ESPRESSO-MV and SIS can be used for the simplification of logics. If the simplification process 41 executes simplification to two-stage logic, a logical expression in POS format (product-of-sums format) would be generated. The logical expression generated during the simplification process 41 can be saved as the logical expression data 32. The POS format is also called the CNF (conjunctive normal form or canonical product-of-sums form).

For example, suppose the user creates the Verilog-HDL file in FIG. 3 and saved the corresponding file to the constraint data 30. If the logical synthesis process 40 and the simplification process 41 are executed using the contents of FIG. 3, the logical expression in (6) can be obtained. The logical expression in (6) can be saved as the logical expression data 32. However, the generator 11 does not necessary have to execute the simplification process 41. In this case, the logical expression not altered by the simplification process 41 is saved as the logical expression data 32.

Figure 8:
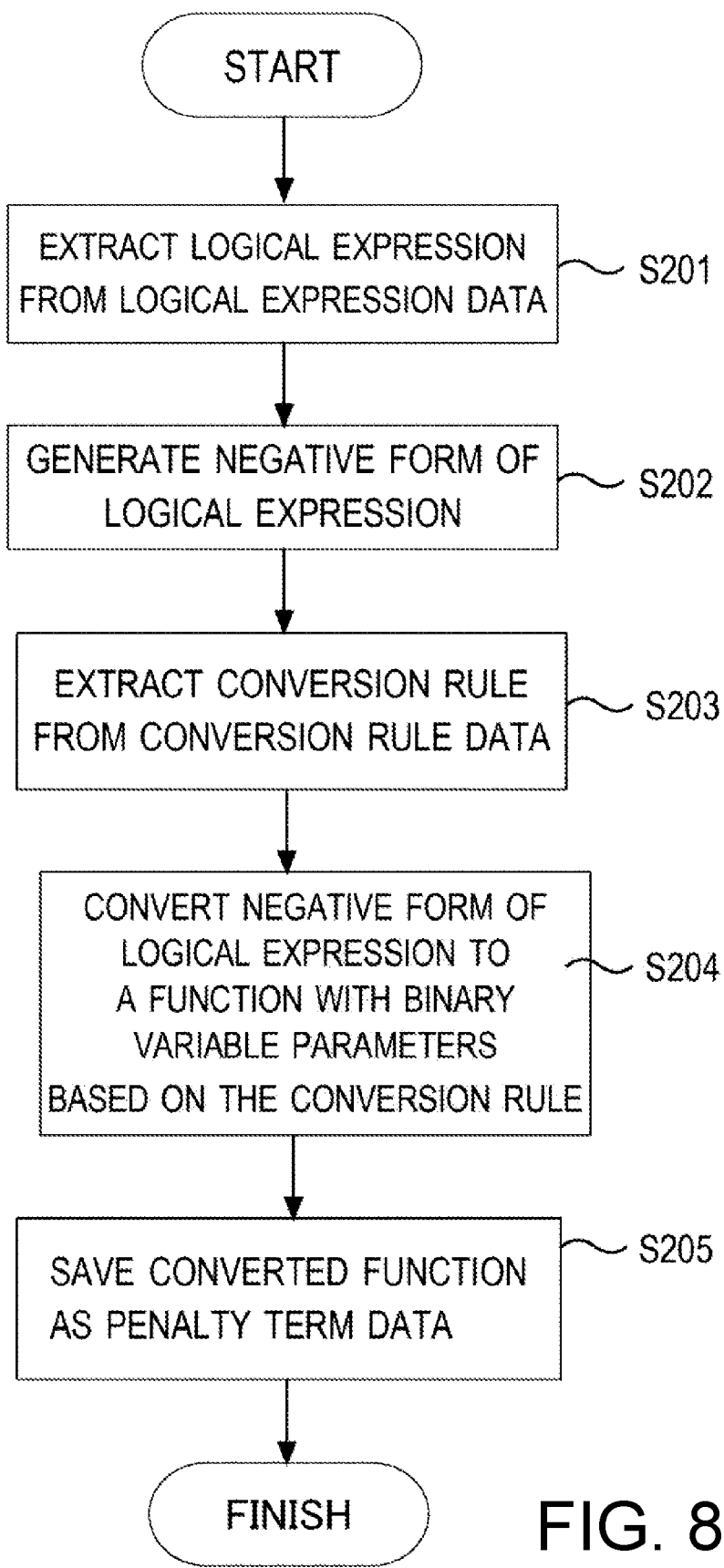
FIG. 8 is a flowchart presenting an example of a penalty term generation process.

Next, the penalty term generation process 42 converts the simplified logical expression to a function having binary variables as parameters. FIG. 8 is a flowchart presenting an example of a penalty term generation process 42. In the following, the process is explained with reference to FIG. 8.

First, the converter 12 reads out the logical expression from the logical expression data 32 in the storage 14 (step S201). Then, the converter 12 generates the negative form of the logical expression which is read out (step S202). For example, if the logical expression of (6) is read out, the negative form of the corresponding logical expression would be the expression (11) described below.

$$(a \wedge b) \vee \bar{c} \quad (11)$$

Next, the converter 12 reads out the conversion rule from the conversion rule data 33 in the storage 14 (step S203). In the table of FIG. 9, an example of the conversion rule (rule 53) is shown. In FIG. 9, "A" represents the variable of Boolean algebra. Also, in FIG. 9, "x" represents the variable after conversion. According to rule 53, the logical conjunction is converted to a product, the logical disjunction is converted to a sum, the positive literal in the variable of Boolean algebra is converted to the binary variable "x", and the negative literal in the variable of Boolean algebra is converted to 1 subtracted by the binary variable ("1-x"), respectively. Here, "x" is a binary variable corresponding to each of the variables in Boolean algebra. During conversion, orders of arithmetic operations are not altered, including cases when the orders are specified explicitly by the use of brackets.

The converter 12 converts the negative form of the logical expression based on the conversion rule which is read out (step S204). For example, if the negative form of the logical expression presented in (11) is converted to a function, a function $p(x_a, x_b, x_c) = x_a x_b + 1 - x_c$ can be obtained. The function p corresponds to the penalty term. In the function p, variables $x_a, x_b, x_c$ each correspond to the variables a, b and c in Boolean algebra described in (6) and (11). The variables $x_a, x_b, x_c$ each take either 0 or 1 as the values. The function p would be a multilinear function. Then, the function p after conversion is saved in the storage 14 as the penalty term data 34 (step S205).

Thus, the explanation of the flowchart in FIG. 8 is completed. In the following, the process executed by the information processing device 1 is explained again with reference to FIG. 7.

The objective function data 35 includes the original objective function without the penalty term. The coefficient data 36 includes the value of the coefficient C which is multiplied with the penalty term. For example, the coefficient C can be a positive real number determined by a user who considers the values of both the objective function and the penalty term. For example, suppose that the difference between the minimum value of the objective function for combination of the decision variables when the constraints are satisfied (feasible solution) and the minimum value of the objective function for combination of the decision variables when the constraints are not satisfied is D. On the other hand, suppose that the difference between the minimum value of the penalty term for combination of the decision variables when the constraints are satisfied (feasible solution) and the minimum value of the penalty term for combination of the decision variables when the constraints are not satisfied is E. In this case, the value of the coefficient C can be set to a value greater than D/E. Depending on the characteristics of the PUBO Solver 2, the coefficient C can be set to a greater value.

The method mentioned above is only one example of methods which can be used for determining the coefficient C. Before starting the calculation, the minimum value of the objective function for the feasible solution (in other words, the solution of the combinatorial optimization problem) cannot be estimated accurately. Therefore, the value of the coefficient C is often set to a relatively large number, taking the nature of the problem into account. Also, there are cases when the calculation in the PUBO solver is executed by using a coefficient C set differently. Thereby, the value of the coefficient C which enables calculations of highly accurate solutions for the corresponding problem can be investigated.

First, in the function synthesis process 43, the original objective function is read out from the objective function data 35, and the value of the coefficient C is read out from the coefficient data 36. Then, the sum of the original objective function and the penalty term weighted with the coefficient C can be calculated. For example, if $x_a-x_b+2x_t$ is read out as the original objective function, the following equation (12) can be obtained.

$$f_p(x_a,x_b,x_c)=x_a-x_b+2x_c+C(x_ax_b+1-x_c) \quad (12)$$

The converter 12 does not necessary have to use the penalty term weighted with the coefficient C when calculating the sum of the penalty term and the original objective function of the combinatorial optimization problem.

The function $f_p(x_a, x_b, x_c)$ in equation (12) is an objective function including the penalty term p. The converter 12 saves the function $f_p(x_a, x_b, x_c)$ to the synthesized objective function data 37 in the storage 14. For example, if the coefficient C is 3, $f_p(x_a, x_b, x_c)=3x_ax_b+x_a-x_b-x_c+3$ holds. Since the constant term does not affect the result of calculation in the PUBO Solver 2, the function without the constant term "+3", $3x_ax_b+x_a-x_b-x_c$ can be saved in the synthesized objective function data 37.

The controller 13 of the information processing device 1 instructs the processing circuit 22 in the PUBO Solver 2 to calculate the solution using the function $f_p$ in the synthesized objective function data 37 as the objective function of the Ising Problem. The PUBO Solver 2 calculates the solution of the Ising Model by using the penalty term (penalty function) or the objective function including the penalty term. Here, both the penalty function and the objective function have binary variables (spins) as their parameters. The Ising Model calculated by the PUBO Solver 2 can have terms of degree 3 or greater with respect to the spins. Also, the controller 13 obtains the calculated solution from the PUBO Solver 2. As a result of calculation in the PUBO Solver 2, a solution $x_a=0$, $x_b=1$ and $x_c=1$ can be obtained. This solution satisfies the constraint of the problem.

In the example above, the penalty term was a quadratic equation. However, the penalty term does not necessary have to be a quadratic equation. In FIG. 10, the values of the penalty term $p(x_a, x_b, x_c)=x_ax_b+1-x_c$ for each combination of the decision variables are presented in a table. Comparing the table of FIG. 10 with the table generated by the method according to the related art, the following differences can be indicated.

In the penalty term of FIG. 5, four variables were necessary. On the other hand, in the penalty term of FIG. 10, three variables are necessary. In the method according to the related art, additional auxiliary variables were necessary. However, in the method according to the embodiment, no additional auxiliary variables are needed. Therefore, the number of decision variables in the objective function including the penalty term can be reduced. This reduces the number of required spins and required calculation time (required computation resources) in the PUBO Solver 2.

If the constraint is satisfied, the values of the penalty terms in FIG. 5 and FIG. 10 are 0, respectively. However, comparing both methods, there is a difference in the range of the penalty term when the constraint is not satisfied. The range of the penalty term in FIG. 10 when the constraint is not satisfied is [1, 2]. On the other hand, the range of the penalty term in FIG. 5 when the constraint is not satisfied is [1, 6]. Suppose that a value greater than D/E is used as the aforementioned coefficient C. In this case, D=1 and E=1 holds. Thus, the values of the coefficient C would be the same for both of the cases. However, the range of the penalty term is smaller in the method according to the embodiment. Thus, the overall impact of the penalty term to the calculation accuracy of the PUBO Solver 2 would be smaller. Thus, compared to the penalty term generated according to the method of the related art, the penalty term generated according to the method of the embodiment is less likely to affect the accuracy of calculation executed in the PUBO solver.

Since simplification to two-stage logic is executed, same variables would not appear in the logical conjunction term of the logical expression generated by the simplification process 41. Therefore, powers equal to or greater than the second order of the variables would not appear in the function p generated by the penalty term generation process 42. Therefore, the penalty term generated by the method according to the embodiment would be a multilinear function. Depending on the simplification method applied to the logical expression, a term including the duplicated variables may be generated. In such cases, duplicated variables can be detected. Then, the duplicated variables can be deleted automatically.

Figure 11:
FIG. 11 is a diagram presenting a second example of a conversion rule.

In above, processes executed when decision variables which take either 0 or 1 as the values were explained. If decision variables which take either −1 or +1 as the values are used, the conversion rule presented in FIG. 11 (rule 54) can be adopted in the penalty term generation process 42. In FIG. 11, "A" indicates the variable in Boolean algebra. Also, in FIG. 11, "x" indicates the variable alter conversion. According to rule 54, the logical conjunction is converted to a product, the logical disjunction is converted to a sum, the positive literal in the variable of Boolean algebra is converted to 1 plus the binary variable divided by 2, the negative literal in the variable of Boolean algebra is converted to 1 subtracted by the binary variable divided by 2, respectively. Here, "x" is a binary variable corresponding to each of the variables in Boolean algebra. During conversion, orders of arithmetic operations are not altered, including cases when the orders are specified explicitly by the use of brackets.

In above, a plurality of conversion rules (rules 53 and 54) used by the converter 12 have been explained. These conversion rules are only examples of conversion rules which can be used to convert the logical expression and generate a penalty term having binary variables as parameters. Therefore, the converter 12 can use other conversion rules are capable of converting the logical conjunction and the logical disjunction in the logical expression to an arithmetic operation, and converting the positive literal and the negative literal in the logical variable to expressions including binary variables.

Next, a case when the method according to the embodiment is applied to the instance example of the aforementioned knapsack problem is explained. In FIG. 12, the constraint in the instance example of the aforementioned knapsack problem is described using a hardware description language. In the example of FIG. 12, Verilog-HDL is being used. In FIG. 12, the 5 bit input, in[1]-in[5] each correspond to the decision variables $x_1$ to $x_5$. The maximum value W for the total weight of items which can be packed into the knapsack was 15. Also, the weights of the items $w_1$ to $w_5$ were, 7, 2, 5, 4 and 3, respectively. If this constraint is formulated, the mathematical expression in (13) can be obtained.

$$7x_1+2x_2+5x_3+4x_4+3x_5 \le 15 \quad (13)$$

In the example of FIG. 12, "1" is the output value when the constraint of (13) is satisfied. Also, in the example of FIG. 12, "0" is the output value when the constraint of (13) is not satisfied. For example, the user can prepare a Verilog-HDL file including the contents of FIG. 12. Then, the corresponding Verilog-HDL file can be saved in the constraint data 30 of the storage 14. Next, as mentioned in the description of FIG. 7, the expression of Boolean algebra is saved in the logical expression data 32 of the storage 14 by the logical synthesis process 40 and the simplification process 41. The following expression (14) is an expression of Boolean algebra corresponding to the constraint of (13).

$$(\overline{X}_1 \vee \overline{X}_3 \vee \overline{X}_4) \wedge (\overline{X}_1 \vee \overline{X}_2 \vee \overline{X}_4 \vee \overline{X}_5) \wedge (\overline{X}_1 \vee \overline{X}_2 \vee \overline{X}_3 \vee \overline{X}_5) \quad (14)$$

Here, the variables $X_1, X_2, X_3, X_4$ and $X_5$ of Boolean algebra each correspond to the variables $x_1, x_2, x_3, x_4$ and $x_5$ in the expression of (13).

The penalty term generation process 42 reads out the aforementioned Boolean algebra expression (14) from the logical expression data 32. Then, the negative form of the expression (14) is generated. The following expression (15) is the negative form of the expression (14).

$$(X_1 \wedge X_3 \wedge X_4) \vee (X_1 \wedge X_2 \wedge X_4 \wedge X_5) \vee (X_1 \wedge X_2 \wedge X_3 \wedge X_5) \quad (15)$$

Next, the conversion rule (for example, rule 53 in FIG. 9) is applied to the expression (15), generating a function having binary variables "x" as the parameters. The following expression (16) is the function generated by converting expression (15). The expression presented in (16) corresponds to the penalty term p.

$$x_1 x_3 x_4 + x_1 x_2 x_4 x_5 + x_1 x_2 x_3 x_5 \quad (16)$$

Here, the binary variables $x_1, x_2, x_3, x_4$ and $x_5$ each corresponds to the variables $X_1, X_2, X_3, X_4$ and $X_5$ in the expression (14).

After the penalty term is generated, the function synthesis process 43 multiplies the coefficient C to the penalty term, generating the weighted penalty term. Also, the function synthesis process 43 adds the weighted penalty term to the original objective function, generating the objective function including the penalty term (synthesized objective function). The solution calculation process 44 is executed in the PUBO Solver 2 by using the objective function including the penalty term.

As presented in (4), W=15 auxiliary variables would be required if the penalty term is generated by the method according to the related art. Even if the method called the "log trick" is used, at least four extra auxiliary variables would be required. However, if the penalty term is generated by the method according to the embodiment, extra auxiliary variables would not be necessary. Since the number of decision variables in the objective function including the penalty term would not increase, the number of spins and computation time (thus, consumption of computing resources) required in the PUBO Solver 2 can be reduced.

In both the method according to the embodiment and the method according to the related art, the value of the penalty terms would be 0 for combinations of decision variables which satisfy the constraint (for the feasible solution). In the method according to the embodiment, the range of the penalty term when the constraint is not satisfied is [1, 3]. However, in the method according to the related art, the range of the penalty term when the constraint is not satisfied is [1, 14596]. Suppose that a value greater than D/E is selected as the coefficient C of the penalty term. In this case, D=1 and E=1 would hold, meaning that the coefficient C would be set to the same value for both of the methods. As it is the case for the method according to the related art, if the range of the penalty term becomes too wide, it would prevent accurate calculations of solutions in the PUBO Solver 2. In some cases, calculations of solutions in the PUBO Solver 2 may become difficult if the method according to the related art is used.

Here, application to the knapsack problem was explained using a small instance of N=5 and W=15. However, in general, the scales of the problems which would be handled tend to be greater than the example used for the above explanations. Therefore, if the method according to the embodiment is applied to generate the penalty term for the problem which needs to be solved, improvements in calculation accuracy, reduction of the number of required spins and reduction of calculation time become possible.

Depending on the type and configuration of the PUBO solvers, calculation using the derivative or the gradient of the objective function including the penalty term can be executed in the PUBO solver. Generally, if the range of the objective function including the penalty term becomes greater, the absolute value of the derivative and the gradient would be also greater. Therefore, even when the value of the objective function including the penalty term is not used directly during the calculation process in the PUBO solver, narrower ranges in the penalty terms can improve the overall calculation accuracy.

By using the information processing system according to the embodiment, the difficulty and the workload required for designing the penalty term can be reduced drastically. Thus, even users without specialized knowledge can design the penalty term corresponding to the problem to be solved. Also, in the information processing system according to the embodiment, the addition of new decision variables can be minimized during the generation of the objective function including the penalty term. Also, since the range of the penalty terms are narrowed, the values of the penalty terms would not be too large with respect to the values of the original objective functions. Therefore, the success rate (the rate of obtaining feasible solutions in the calculations) of solving the problems on the computer (for example, solvers such as the PUBO solvers) can be improved drastically, accelerating the calculation of solutions for various combinatorial optimization problems.

In the information processing device mentioned above, the generated penalty term was synthesized with the original objective function to solve the combinatorial optimization problem. However, the penalty term does not always have to be synthesized with the original objective function. For example, as explained below, the solution of the combinatorial optimization problem can be calculated by using only the penalty term (without the original objective function). In the following, the information processing system which calculates the solution of the combinatorial optimization problem by using only the penalty term is explained. Since the configuration is similar to the aforementioned information processing system, mainly the differences in the executed processes are explained below. Also, the components presented in FIG. 1 are referred, when necessary.

Figure 13:
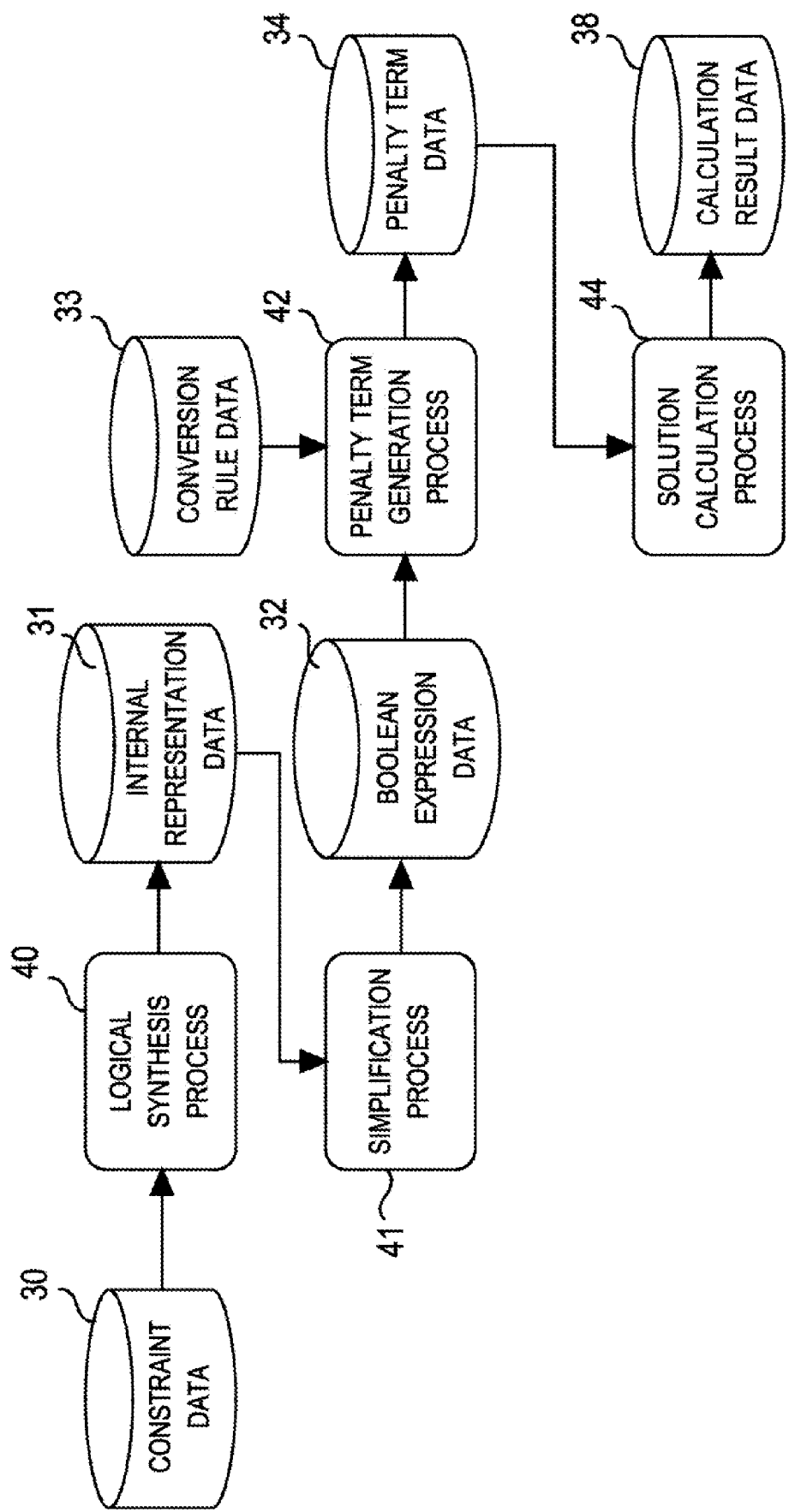
FIG. 13 is a diagram presenting a second example of relation between each processing step executed by the information processing device and data.

FIG. 13 is a diagram presenting a second example of relation between each processing step executed by the information processing device and data. One difference between FIG. 7 (first example) is the fact that calculation in the PUBO Solver 2 is executed by using the penalty function (penalty term) stored in the penalty term data 34. Another difference is the fact that the objective function data 35, the coefficient data 36 and the synthesized objective function data 37 are not used. Furthermore, the function synthesis process 43 is not executed. Other data and processes in FIG. 13 are similar to FIG. 7.

The terms used in the embodiments should be interpreted broadly. For example, the term "processor" may include a general-purpose processor, a central processor (CPU), a microprocessor, a digital signal processor (DSP), a controller, a micro-controller, and a state machine. Depending on situations, the "processor" may indicate an application specific integrated circuit, a field programmable gate array (FPGA), a programmable logic circuit (PLD), and the like. The "processor" may indicate a combination of processing devices such as a plurality of microprocessors, a combination of a DSP and a microprocessor, and one or more microprocessors cooperating with a DSP core.

As another example, the term "memory" may include any electronic component capable of storing electronic information. The "memory" can indicate a random access memory (RAM), a read only memory (ROM), a programmable read only memory (PROM), an erasable programmable read only memory (EPROM), an electrically erasable PROM (EEPROM), a nonvolatile random access memory (NVRAM), a flash memory, and a magnetic or optical data storage. The data saved in the devices mentioned above can be read by a processor. If the processor performs reads, writes or both reads and writes to the memory, the memory can be considered to be communicating electrically with the processor. The memory can be integrated with the processor. In such cases as well, the memory can be considered as communicating electrically with the processor.

The term "storage device" or "storage" may include any device that can store data using magnetic technology, optical technology, or nonvolatile memory. For example, the storage can be a HDD, an optical disk, a SSD, or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing system comprising:
an information processing device configured to:
generate logical expression data from constraint data including a constraint of a combinatorial optimization problem expressed in a formal language;
generate a penalty term data including a penalty term having a binary variable parameter by converting the logical expression data; and
generate objective function data which includes an objective function of the combinatorial optimization problem synthesized with the penalty term; and
a PUBO solver comprising a controller, a processing circuit, and a communication circuit, wherein:
the communication circuit is configured to receive a control signal transmitted from the information processing device;
the controller is configured to control the processing circuit based on the received control signal, causing the PUBO solver to calculate a solution of an Ising Model by using the binary variable parameter in the penalty term data or the objective function data as spins, and
the controller to transmit data including the solution to the information processing device via the communication circuit,
wherein
a first storage is configured to store first objective function data which includes an objective function of the combinatorial optimization problem, and the information processing device is configured to generate second objective function data which includes the objective function synthesized with the penalty term.

2. The information processing system according to claim 1, wherein
the Ising Model includes a term with degree 3 or higher, with respect to the spins.

3. The information processing system according to claim 1, wherein the information processing device is further configured to:
calculate a solution of the combinatorial optimization problem based on the solution of an Ising Model; and
communicate the solution of the combinatorial optimization problem to an external device.

4. The information processing system according to claim 1, wherein
a degree of the penalty term in the penalty term data has a degree of 2 or lower.

5. The information processing system according to claim 1, wherein
the information processing device is configured to generate the penalty term data by converting a logical conjunction and a logical disjunction in the logical expression data to an arithmetic operation, and converting a positive literal and a negative literal of a logical variable to an expression including the binary variable parameter.

6. The information processing system according to claim 1, wherein
the information processing device is configured to generate the penalty term data by converting a logical conjunction in the logical expression data to a product, converting a logical disjunction in the logical expression data to a sum, converting a positive literal of a logical variable to the binary variable parameter, and converting a negative literal of a logical variable to 1 subtracted by the binary variable parameter.

7. The information processing system according to claim 1, wherein
the information processing device is configured to generate the penalty term data by converting a logical conjunction in the logical expression data to a product, converting a logical disjunction in the logical expression data to a sum, converting a positive literal of a logical variable to 1 plus the binary variable parameter divided by 2, and converting a negative literal of a logical variable to 1 subtracted by the binary variable parameter divided by 2.

8. The information processing system according to claim 1, wherein
the information processing device is configured to generate the logical expression data including a logical equation simplified to two-stage logic.

9. The information processing system according to claim 1, wherein
the information processing device is configured to generate the logical expression data by executing logical synthesis using the constraint data.

10. An information processing method comprising the steps of:
generating logical expression data from constraint data including a constraint of a combinatorial optimization problem expressed in a formal language;
generating a penalty term data including a penalty term having a binary variable parameter by converting the logical expression data;

generating objective function data which includes an objective function of the combinatorial optimization problem synthesized with the penalty term;

providing the penalty term data and the objective function data to a PUBO solver, the PUBO solver comprising a controller, a processing circuit, and a communication circuit;

receiving, by the communication circuit, a control signal transmitted from an information processing device;

controlling, by the controller, the processing circuit based on the received control signal;

calculating, by the PUBO solver as a result of the controller controlling the processing circuit, a solution of an Ising Model by using the binary variable parameter in the penalty term data or the objective function data as spins;

transmitting, by the controller, data including the solution to the information processing device via the communication circuit;

storing, in a first storage, first objective function data which includes an objective function of the combinatorial optimization problem; and generating second objective function data which includes the objective function synthesized with the penalty term.

11. The information processing method according to claim 10, wherein
the Ising Model includes a term with degree 3 or higher, with respect to the spins.

12. The information processing method according to claim 10, further comprising the steps of:
calculating a solution of the combinatorial optimization problem based on the solution of an Ising Model; and
communicating the solution of the combinatorial optimization problem to an external device.

13. The information processing method according to claim 10, wherein
a degree of the penalty term in the penalty term data has a degree of 2 or lower.

14. The information processing method according to claim 10, further comprising:
generating the penalty term data by converting a logical conjunction and a logical disjunction in the logical expression data to an arithmetic operation, and converting a positive literal and a negative literal of a logical variable to an expression including the binary variable parameter.

15. The information processing method according to claim 10, further comprising:
generating the penalty term data by converting a logical conjunction in the logical expression data to a product, converting a logical disjunction in the logical expression data to a sum, converting a positive literal of a logical variable to the binary variable parameter, and converting a negative literal of a logical variable to 1 subtracted by the binary variable parameter.

16. The information processing method according to claim 10, further comprising:
generating the penalty term data by converting a logical conjunction in the logical expression data to a product, converting a logical disjunction in the logical expression data to a sum, converting a positive literal of a logical variable to 1 plus the binary variable parameter divided by 2, and converting a negative literal of a logical variable to 1 subtracted by the binary variable parameter divided by 2.

17. The information processing method according to claim 10, further comprising:
generating the logical expression data including a logical equation simplified to two-stage logic.

18. The information processing method according to claim 10, further comprising:
generating the logical expression data by executing logical synthesis using the constraint data.

19. An information processing system comprising:
an information processing device configured to:
generate logical expression data from constraint data including a constraint of a combinatorial optimization problem expressed in a formal language;
generate a penalty term data including a penalty term having a binary variable parameter by converting the logical expression data; and
generate objective function data which includes an objective function of the combinatorial optimization problem synthesized with the penalty term; and
a PUBO solver comprising a controller, a processing circuit, and a communication circuit, wherein:
the communication circuit is configured to receive a control signal transmitted from the information processing device;
the controller is configured to control the processing circuit based on the received control signal, causing the PUBO solver configured to calculate a solution of an Ising Model by using the binary variable parameter in the penalty term data or the objective function data as spins, and
the controller to transmit data including the solution to the information processing device via the communication circuit,
wherein the information processing device is configured to generate the penalty term data by converting a logical conjunction and a logical disjunction in the logical expression data to an arithmetic operation, and converting a positive literal and a negative literal of a logical variable to an expression including the binary variable parameter.

* * * * *